(12) United States Patent
Stoyanov et al.

(10) Patent No.: US 8,924,512 B2
(45) Date of Patent: Dec. 30, 2014

(54) EXTENSIBLE REMOTE DISPLAY INFRASTRUCTURE WITH DYNAMIC VIRTUAL CHANNELS

(75) Inventors: Vladimir Stoyanov, Redmond, WA (US); Ivan Brugiolo, Redmond, WA (US); Nadim Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1834 days.

(21) Appl. No.: 11/763,917

(22) Filed: Jun. 15, 2007

(65) Prior Publication Data
US 2008/0313549 A1 Dec. 18, 2008

(51) Int. Cl.
G06F 15/16 (2006.01)
G06F 9/44 (2006.01)
G06F 9/445 (2006.01)

(52) U.S. Cl.
CPC .......... *G06F 9/4445* (2013.01); *G06F 9/44526* (2013.01)
USPC ............ 709/219; 709/217; 709/203; 709/231

(58) Field of Classification Search
CPC ................................... G06F 9/4445
USPC ........................................ 709/219
See application file for complete search history.

(56) References Cited

U.S. PATENT DOCUMENTS

| | | | |
|---|---|---|---|
| 5,359,601 A | 10/1994 | Wasilewski et al. | |
| 5,892,923 A | 4/1999 | Yasuda et al. | |
| 5,991,892 A | 11/1999 | Honda | |
| 6,041,063 A | 3/2000 | Povlsen et al. | |
| 6,680,922 B1 | 1/2004 | Jorgensen | |
| 6,757,735 B2 | 6/2004 | Apostolopulos et al. | |
| 6,944,173 B1 | 9/2005 | Jones et al. | |
| 7,058,061 B2 | 6/2006 | Tanaka et al. | |
| 2001/0047406 A1* | 11/2001 | Araujo et al. ................. | 709/223 |
| 2003/0160813 A1* | 8/2003 | Raju .............................. | 345/730 |
| 2003/0199246 A1 | 10/2003 | Friedman et al. | |
| 2004/0181589 A1 | 9/2004 | Suleiman | |
| 2006/0230438 A1 | 10/2006 | Shappir et al. | |
| 2007/0079244 A1* | 4/2007 | Brugiolo ....................... | 715/740 |
| 2007/0244966 A1* | 10/2007 | Stoyanov et al. ............. | 709/204 |

OTHER PUBLICATIONS

Coons 111, "Virtual Thin Client: A Scalable Service Discovery Approach for Pervasive Computing", available at least as early as Feb 1, 2007, at <<http://etd.fcla.edu/UF/anp4316/CoonsThesis.PDF>>, 2001, pp. 1-79.

(Continued)

*Primary Examiner* — Noel Beharry
(74) *Attorney, Agent, or Firm* — Kate J. Drakos; Micky Minhas

(57) ABSTRACT

An extensible remote display infrastructure is described that provides support for a competitive multi-vendor development environment. Application functionality may be partitioned to suit the needs of a given application and client-side functionality may be packaged in dynamic virtual channel plug-ins for remote display clients. Interactive coupling between the remote display clients and the dynamic virtual channel plug-ins may be facilitated by remote display client extensibility repositories. The remote display client extensibility repositories may be located within a communication infrastructure aspect of the extensible remote display infrastructure and, in particular, at a static virtual channel level. Dynamic virtual channel plug-ins may register properties, functionality and/or components with remote display client extensibility repositories at available granularity.

20 Claims, 9 Drawing Sheets

(56) References Cited

OTHER PUBLICATIONS

Helepovic, et al., "Building a P2P Forum System with JXTA", available at least as early as Feb 1, 2007, at <<http://ieeexplore.ieee.org/iel5/8107/22420/01046311.pdf?isNumber=>>, IEEE, 2002, pp. 1-8.

Yu, et al., "Display-Only File Server: A Solution against Information Theft Due to Insider Attack", available at least as early as Feb 1, 2007, at <<http://www.ecsl.cs.sunysb.edu/tr/TR170.pdf>>, ACM, 2004, pp. 1-9.

* cited by examiner

EXTENSIBLE REMOTE DISPLAY INFRASTRUCTURE WITH DYNAMIC VIRTUAL CHANNELS

BACKGROUND

Since soon after the advent of computer networks, it has been common to operate remote computers (e.g., server class computers) from conveniently local computers (e.g., workstation or desktop class computers). As computer user interfaces (UIs) progressed from text-based user interfaces to increasingly sophisticated graphical user interfaces (GUIs), there has naturally been a desire to operate remote computers using a graphical user interface and, if possible, a graphical user interface as close as possible to that which would be presented by the computer if the user were local. However, the increase in complexity associated with graphical user interfaces has brought with it several challenges.

The simplest remote display clients send local user input (e.g., mouse and keyboard input) to the remote computer and receive display bitmap updates from the remote computer. While this can produce adequate results for some applications in higher bandwidth networks, it becomes less satisfactory as application variety increases (particularly to include high-end applications) and as available bandwidth drops to more common levels. Going beyond this simple client commonly requires some partition of application functionality and relocation of some server-side functionality to the client. However, this requires that an entire spectrum of distributed application issues be addressed.

Application functionality partitioning is a challenge in itself, typically done on a case by case basis by the application designers. The usual complications of a multi-vendor environment are exacerbated by the common circumstance that the remote display client is implemented by an independent vendor and that even the remote operating system may be considered an application in this context. With the added problem of differing versions of distributed components in the installed base, it can be a challenge maintaining correct functionality, let alone a cohesive remote graphical user interface experience.

A desirable remote display infrastructure is, then, extensible in the context of a competitive multi-vendor environment, and provides support for solutions to distributed application issues without unduly constraining the solution space. In particular, this includes appropriate encapsulation of inter-vendor functionality and data spaces, with an ability to expose functionality at arbitrary granularity if possible. It is further desirable that established functionality (e.g., communication infrastructure) be reusable to the extent possible, and that distributed component version differences and conflicts be handled gracefully. Previous remote display infrastructures fail to effectively achieve one or more of these desirable characteristics and/or make awkward choices where trade offs are required.

SUMMARY

An extensible remote display infrastructure is described that provides support for a competitive multi-vendor development environment. Application functionality may be partitioned to suit the needs of a given application and client-side functionality may be packaged in dynamic virtual channel plug-ins for remote display clients. Interactive coupling between the remote display clients and the dynamic virtual channel plug-ins may be facilitated by remote display client extensibility repositories. The remote display client extensibility repositories may be located within a communication infrastructure aspect of the extensible remote display infrastructure and, in particular, at a static virtual channel level. Dynamic virtual channel plug-ins may register properties, functionality and/or components with remote display client extensibility repositories at available granularity.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

In an embodiment of the invention, an extensible remote display infrastructure is enabled that provides robust support for a competitive multi-vendor development environment. In particular, application functionality may be partitioned to suit the needs of a given application and client-side functionality may be packaged as a dynamic virtual channel plug-in for remote display clients. Suitable remote display clients and dynamic virtual channel plug-ins may be implemented by multiple independent vendors and/or include multiple implementation versions.

In an embodiment of the invention, interactive coupling between remote display clients and dynamic virtual channel plug-ins is facilitated by one or more remote display client extensibility repositories. Remote display client extensibility repositories may be located within a communication infrastructure aspect of the extensible remote display infrastructure and, in particular, at a static virtual channel level. Location at the static virtual channel level may facilitate data space partitioning at an application and/or dynamic virtual channel plug-in level, as well as providing a global (e.g., trans-application) data space for the remote display client. Dynamic virtual channel plug-ins may register properties, functionality and/or components with remote display client extensibility repositories at available granularity.

Figure 1:
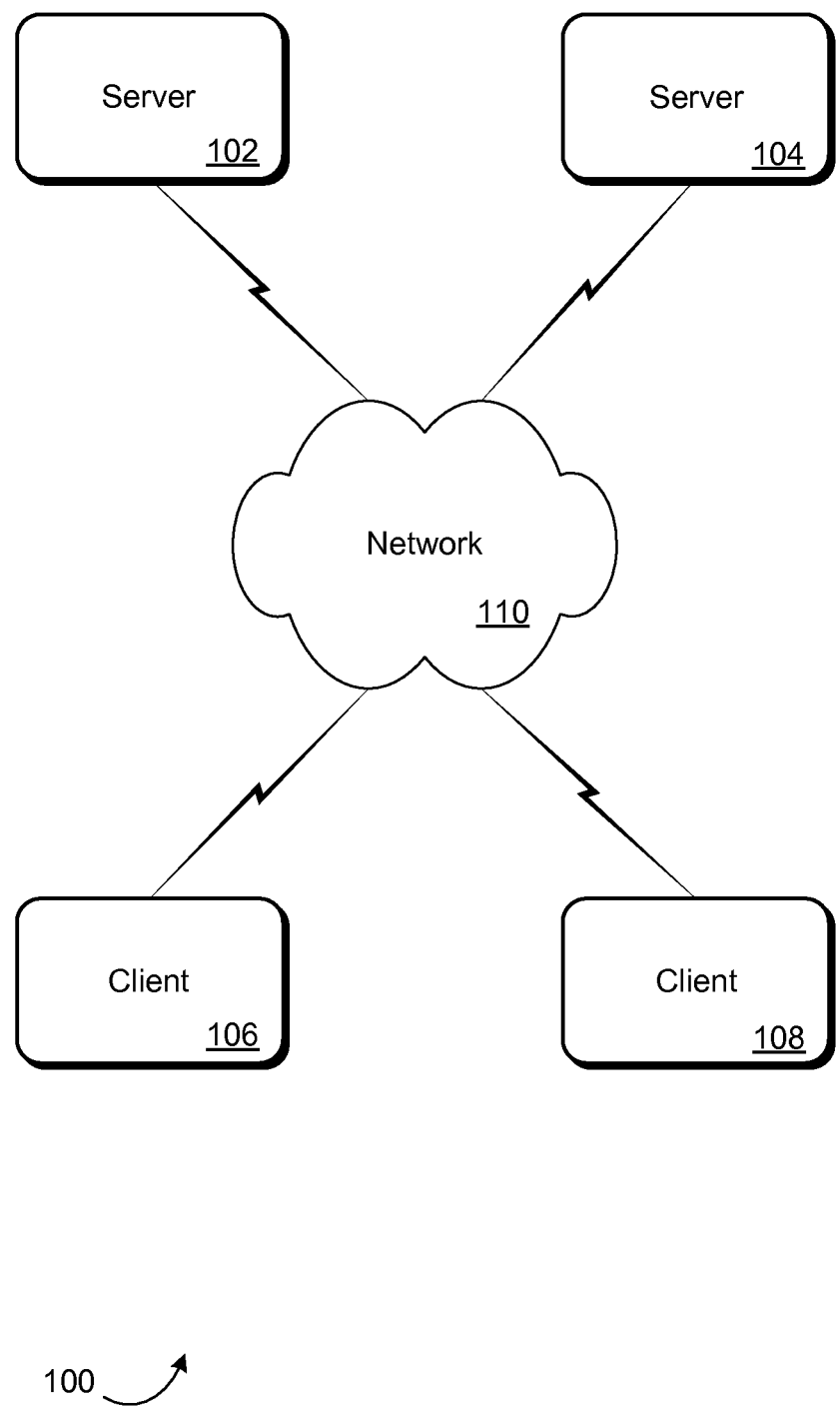
FIG. 1 is a schematic diagram depicting an example computing environment suitable for incorporating an embodiment of the invention.

Before describing aspects of an extensible remote display infrastructure in accordance with an embodiment to the invention in more detail, it will be helpful to have reference to an example computing environment suitable for incorporating such an infrastructure. FIG. 1 depicts a suitable computing environment 100. The computing environment 100 depicts four computers 102, 104, 106, 108 connected by a network 110. For clarity, two of the computers 102, 104 are designated as servers, and two of the computers 106, 108 are designated as clients. Embodiments of the invention are not so limited and may include any suitable number of computers, servers and/or clients. Furthermore, as will be apparent to one of skill in the art, any of the computers 102, 104, 106, 108 may perform in multiple roles so that, for example, the computer 104 may change roles to become a client or act as both server and client simultaneously.

The computers 102, 104, 106, 108 may be any suitable computing device. Examples of suitable computing devices include mainframes, minicomputers, desktop computers, personal computers (PCs), workstations, portable computers, laptop computers, tablet computers, personal digital assistants (PDAs), mobile telephones, programmable consumer electronics devices, routers, gateways, switches, hubs, and suitable combinations thereof. The computers 102, 104, 106, 108 may include one or more processing units capable of executing instructions to perform tasks, as well as one or more types of computer-readable media such as volatile and/or non-volatile memory capable of storing data, computer programs and/or computer program components. Such computer programs and components may include executable instructions, structured data and/or unstructured data organized into modules, routines and/or any suitable programmatic object. Such computer programs and components may be created by and/or incorporate any suitable computer programming language.

The computers 102, 104, 106, 108 may include a wide variety of input/output (I/O) devices not shown in FIG. 1 such as keyboards, keypads, touchpads, mice, trackballs, pens, joysticks, gamepads, scanners, cameras, microphones, monitors, liquid crystal displays (LCDs), light emitting diodes (LEDs), printers and/or speakers. Examples of computer-readable media suitable for reading by the computers 102, 104, 106, 108 include any one or more of magnetic media (such as hard disks), optical media such as compact disks (CDs) and communication media. Communication media may include any one or more of wired communication media such as copper wire, coaxial cable and optical fiber, as well as wireless communication media such as electro-magnetic media including radio, microwave, infra-red and laser light. In an embodiment of the invention, computer-readable media is tangible.

For clarity, embodiments of the invention may be described herein with reference to symbolic operations such as those of a computer programming language. Such symbolic operations and any data that they act upon correspond to physical states of components and changes in components of computing devices such as the computers 102, 104, 106, 108 in a manner well understood by one of skill in the art. In an embodiment of the invention, each such operation and its associated data may be fully implemented in hardware.

The network 110 may include any suitable network element and/or communication media. A computing device is an example of a suitable network element. The network 110 may incorporate any suitable network topology. Examples of suitable network topologies include simple point-to-point, star topology, self organizing peer-to-peer topologies and combinations thereof. Furthermore, the network 110 may employ any suitable network protocol to establish and/or maintain connectivity between the computers 102, 104, 106, 108. Examples of suitable network protocols include transmission control protocols (TCP), internet protocols (IP), remote desktop protocols (RDP), data link layer protocols, as well as suitable higher and lower layer protocols, for example, protocols associated with layers as described by the well known International Organization for Standardization (ISO) Open System Interconnection (OSI) Basic Reference Model.

For at least the purposes of this description, servers or server class computers such as computers 102, 104 may be classified in contrast to clients or client class computers such as computers 106, 108. Typically a single server such as the computer 102 has the capability of serving (e.g., providing services to) a plurality of clients such as computers 106, 108. For example, server class computers may have greater processing, volatile storage and/or non-volatile storage capacities than client class computers. Although not shown in FIG. 1, the network 110 may include any suitable number of intermediate proxies and/or tiers, for example, as part of an "n-tier" architecture. For clarity, in what follows remote display clients may be assumed to be located at client class computers such as computers 106, 108, and to be accessing applications located at server class computers such as computers 102, 104.

Figure 2:
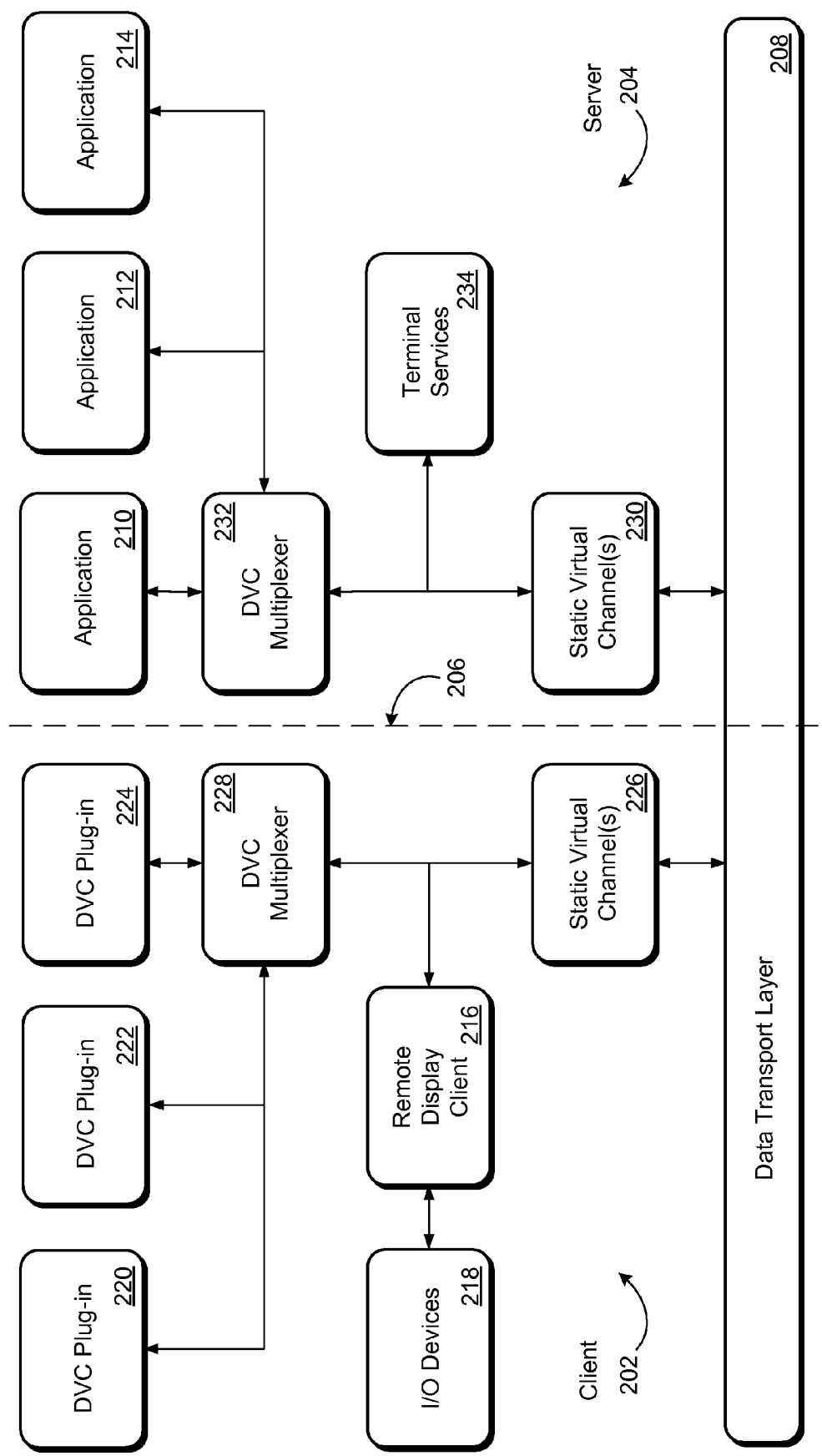
FIG. 2 is a schematic diagram depicting a high level overview of an example extensible remote display infrastructure architecture in accordance with an embodiment of the invention.

An extensible remote display infrastructure in accordance with an embodiment of the invention may include components at clients such as computers 106, 108 and servers such as computers 102, 104. FIG. 2 depicts a suitable example of an extensible remote display infrastructure architecture 200 at a high level. The example extensible remote display infrastructure architecture 200 includes client-side 202 and server-side 204 aspects delineated by a dashed line 206. For example client-side 202 aspects may be located at one or more of computers 106, 108 and server-side 204 aspects may be located at one or more of computers 102, 104. The client-side 202 and server-side 204 aspects may be communicatively connected by a data transport layer 208. For example, the data transport layer 208 may be implemented with one or more communication services provided by the network 110 (FIG. 1).

The server-side 204 aspects may include one or more applications such as applications 210, 212, 214. The client-side 202 aspects may include a remote display client 216 capable of accessing functionality of the applications 210, 212, 214, and, in particular, capable of displaying graphical user interfaces associated with the applications 210, 212, 214. Although, for clarity, a single remote display client 216 is shown in FIG. 2, each embodiment of the invention is not so limited. For example, the computer 106 (FIG. 1) incorporating the client-side 202 aspects may incorporate multiple remote display clients such as the remote display client 216, and the multiple remote display clients may be used by a single user or by multiple users to access remote application functionality. In an embodiment of the invention, it is a role of the remote display client 216 to manage, filter, respond and/or facilitate response to user input, for example, from input/output (I/O) devices 218.

The client-side 202 aspects may further include one or more dynamic virtual channel (DVC) channel plug-ins such as dynamic virtual channel plug-ins 220, 222, 224. The dynamic virtual channel plug-ins 220, 222, 224 may include functionality corresponding to functionality of the applications 210, 212, 214. For example, the functionality of the dynamic virtual channel plug-ins 220, 222, 224 may compliment and/or enhance functionality of the applications 210, 212, 214. In particular, dynamic virtual channel plug-in 220, 222, 224 functionality may include aspects of application 210, 212, 214 functionality that is more effectively executed at the client-side 202 rather than the server-side 204 in a remote access scenario, for example, more effective in terms of user experience. The remote display client 202 may discover, activate, load and/or access the functionality of dynamic virtual channel plug-ins such as the dynamic virtual channel plug-ins 220, 222, 224. Similarly, each dynamic virtual channel plug-ins 220, 222, 224 may utilize its functionality to provide one or more services to the remote display client 202

Despite having the term "plug-in" in their names, dynamic virtual channel plug-ins such as the dynamic virtual channel plug-ins 220, 222, 224 may be program components of significant sophistication, functionality and/or complexity. In particular, dynamic virtual channel plug-ins 220, 222, 224 may be considered communication destinations in a manner similar to, for example, computers 102, 104, 106 108 (FIG. 1) and/or network elements of the network 110. To facilitate this aspect of dynamic virtual channel plug-ins 220, 222, 224, a communication infrastructure aspect, and in particular, the client-side 202 communication infrastructure aspect, of the extensible remote display infrastructure architecture 200 may include one or more static virtual channels 226 and a dynamic virtual channel (DVC) multiplexer 228. The dynamic virtual channel plug-ins 220, 222, 224 may be implemented as dynamic-link libraries (DLL), participate in a component object model (COM), be associated with an independent full-weight computer process and/or be contained within any suitable program component execution environment.

Each client-side 202 static virtual channel 226 object may have a corresponding server-side 204 static virtual channel 230 object. Similarly, each client-side 202 dynamic virtual channel multiplexer 228 may have a corresponding server-side 204 dynamic virtual channel (DVC) multiplexer 232. Each static virtual channel 226, 230 may have a communication channel aspect in that, for example, it may facilitate a communicative connection between client-side 202 aspects of the extensible remote display infrastructure architecture 200 and server-side 204 aspects. Static virtual channels 226, 230 may be considered as participating in a static virtual channel communication layer or level. Each static virtual channel 226, 230 may be considered a virtual communication channel in that, for example, it may facilitate further communication multiplexing in addition to that provided by the data transport layer 208. In particular, each static virtual channel may facilitate individually addressable dynamic virtual channel plug-ins 220, 222, 224 in the extensible remote display infrastructure architecture 200, for example, individually addressable by the applications 210, 212, 214. In an embodiment of the invention, static virtual channels 226, 230 utilize explicit dynamic virtual channel multiplexers 228, 232 to route communications to and/or from individual applications 210, 212, 214 and dynamic virtual channel plug-ins 220, 222, 224.

Furthermore, static virtual channels 226, 230 may be considered static, for example, in contrast to dynamic virtual channels facilitated by dynamic virtual channel plug-ins 220, 222, 224. In particular, static virtual channels 226, 230 may have longer instance lifetimes than dynamic virtual channels facilitated by dynamic virtual channel plug-ins 220, 222, 224 and may persist throughout instance lifetimes of sets of dynamic virtual channels. For example, a particular one of the static virtual channels 226 may be instantiated by the remote display client 216, prior to the dynamic virtual channel plug-ins 220, 222, 224 being activated by the remote display client 216, and the particular one of the static virtual channels 226 may persist throughout the lifetimes of any dynamic virtual channels instantiated by the dynamic virtual channel plug-ins 220, 222, 224.

The server-side 204 aspect of the extensible remote display infrastructure architecture 200 may further include a terminal services 234 component. The terminal services 234 may facilitate and/or manage access to applications 210, 212, 214 by remote display clients such as the remote display client 216. For example, the terminal services 234 may manage and/or facilitate static virtual channels 230. In an embodiment of the invention, applications 210, 212, 214 may incorporate at least some terminal services 234 functionality.

Arrows between components 208, 210, 212, 214, 216, 218, 220, 222, 224, 226, 228, 230, 232, 234 of the extensible remote display infrastructure architecture 200 highlight significant aspects of data flow between the components 208, 210, 212, 214, 216, 218, 220, 222, 224, 226, 228, 230, 232, 234, and in particular, communication infrastructure aspects. However, data exchange between the components 208, 210, 212, 214, 216, 218, 220, 222, 224, 226, 228, 230, 232, 234 is not limited to data flows indicated by the arrows, and may occur by way of any suitable data exchange mechanism. Similar statements hold for like arrows in FIGS. 3 and 4.

The nature and potential complexity of the dynamic virtual channel plug-ins 220, 222, 224, the context of a competitive multi-vendor development environment, the possibility of multiple implementation versions in the installed base, and other distributed application issues, as described above, combine to make the design of mechanisms by which the remote display client 216 and the dynamic virtual channel plug-ins 220, 222, 224 couple and/or interact significant. In an embodiment of the invention, it is, in particular, desirable that the remote display client 216 implementation of one vendor be substitutable with an implementation of another vendor and that alternate implementations be able to reuse other aspects of the extensible remote display infrastructure architecture 200, particularly functionality of the dynamic virtual channel plug-ins 220, 222, 224, as much as possible. Such alternate implementations are rarely simple duplicates of one another. For example, alternate remote display client 216 implementations may access different dynamic virtual channel plug-ins 220, 222, 224, different versions of the dynamic virtual channel plug-ins 220, 222, 224 and/or different functionality of the same dynamic virtual channel plug-ins 220, 222, 224. In an embodiment of the invention, challenges of remote display client 216 and dynamic virtual channel plug-in 220, 222, 224 coupling and interaction are addressed with one or more remote display client extensibility repositories incorporated into the static virtual channels 226 of the extensible remote display infrastructure architecture 200.

Figure 3:
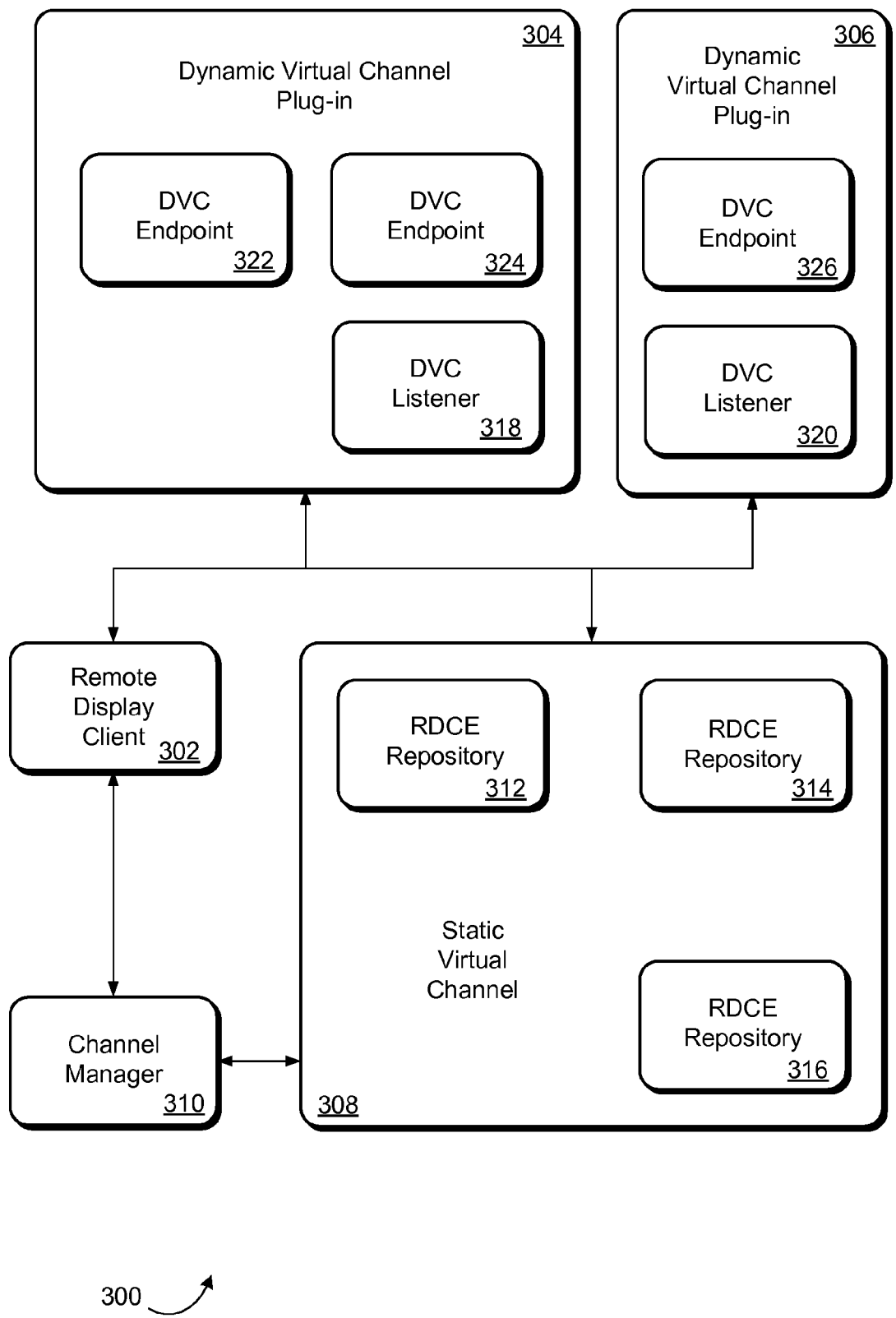
FIG. 3 is a schematic diagram depicting example details of client-side aspects of the extensible remote display infrastructure architecture in accordance with an embodiment of the invention.

To describe coupling and interaction of the remote display client 216 and dynamic virtual channel plug-ins 220, 222, 224 in more detail, it will be helpful to have reference to a more detailed depiction of client-side 202 aspects of the extensible remote display infrastructure architecture 200. FIG. 3 depicts selected client-side aspects 300 of the extensible remote display infrastructure architecture 200 (FIG. 2) in more detail. The depicted client-side aspects 300 include a remote display client 302, multiple dynamic virtual channel plug-ins 304, 306, a static virtual channel 308, and a channel manager 310. For example, the remote display client 302 may incorporate characteristics of the remote display client 216 (FIG. 2), the dynamic virtual channel plug-ins 304, 306 may incorporate characteristics of the dynamic virtual channel plug-ins 220, 222, 224, and the static virtual channel 308 may incorporate characteristics of the static virtual channel 226.

The channel manager 310 may manage and/or facilitate the operation of the static virtual channel 308. For example, the channel manager 310 may manage the lifetime of the static virtual channel 308. The remote display client 302 may request that the channel manager 310 create a static virtual channel such as the static virtual channel 308, return information about the static virtual channel 308, provide a reference to the static virtual channel 308, update a configuration of the static virtual channel 308, and/or destroy the static virtual channel 308. In an embodiment of the invention, the channel manager 310 may be incorporated into the remote display client 302.

The remote display client 302 may discover the dynamic virtual channel plug-ins 304, 306. For example, the dynamic virtual channel plug-ins 304, 306 may be members of a set of dynamic virtual channel plug-ins (now shown in FIG. 3) that are stored at one or more locations of the computers 102, 104, 106, 108 (FIG. 1) and/or network elements of the network 110. The remote display client 302 may search the set with any suitable search mechanism to find the dynamic virtual channel plug-ins 304, 306.

The remote display client 302 may load and/or activate the dynamic virtual channel plug-ins 304, 306. For example, a loading action of the remote display client 302 may cause functionality of the dynamic virtual channel plug-ins 304, 306 to be prepared for execution. The dynamic virtual channel plug-ins 304, 306 may be prepared for execution in a manner corresponding to their implementation, for example, in the manner required by a dynamic-link library (DLL), a component object model (COM) object, an independent computer process, and so on. As part of the loading action, the remote display client 302 may gain access to some functionality of the dynamic virtual channel plug-ins 304, 306. For example, the remote display client 302 may gain access to dynamic virtual channel plug-in 304, 306 functionality that is generic to dynamic virtual channel plug-ins, in contrast to functionality that is particular to the dynamic virtual channel plug-ins 304, 306. However, in an embodiment of the invention, access to some functionality of the dynamic virtual channel plug-ins 304, 306 requires that the dynamic virtual channel plug-ins 304, 306 be activated.

The dynamic virtual channel plug-ins 304, 306 may be activated. For example, the dynamic virtual channel plug-ins 304, 306 may be activated by the remote display client 302. The dynamic virtual channel plug-ins 304, 306 may self-activate, for example, responsively to loading. As part of activation, the dynamic virtual channel plug-ins 304, 306 may register properties, functionality and/or components. In an embodiment of the invention, the dynamic virtual channel plug-ins 304, 306 register properties, functionality and/or components with one or more remote display client extensibility repositories such as remote display client extensibility repositories 312, 314, 316 of the static virtual channel 308.

The dynamic virtual channel plug-ins 304, 306 may each include one or more dynamic virtual channel (DVC) listeners such as dynamic virtual channel listeners 318, 320. As part of activation, each dynamic virtual channel plug-ins 304, 306 may register an associated dynamic virtual channel listener 318, 320 (respectively in FIG. 3) with the static virtual channel 308. Each dynamic virtual channel listener 318, 320 may have a communication address such as a name. The dynamic virtual channel plug-in 304, 306 associated with the dynamic virtual channel listener 318, 320 may thereby become communicatively addressable in the extensible remote display infrastructure architecture 200 (FIG. 2) and, in particular, by server-side 204 applications 210, 212, 214.

Each dynamic virtual channel plug-in 304, 306 may include functionality of use to multiple applications 210, 212, 214 (FIG. 2). Furthermore, the remote display client 302 may, at times, present multiple instances of ones of the applications 210, 212, 214, so that associated dynamic virtual channel plug-in 304, 306 functionality is simultaneously reused by the ones of the applications 210, 212, 214, for example, in a multithreaded execution context. In an embodiment of the invention, complexities associated with simultaneous reuse of dynamic virtual channel plug-in 304, 306 functionality by one or more applications 210, 212, 214 is managed with dynamic virtual channels.

Dynamic virtual channels may be created (e.g., instantiated) dynamically by dynamic virtual channel listeners 318, 320. In an embodiment of the invention, each such dynamic virtual channel is associated with a dynamic virtual channel endpoint 322, 324, 326. Each dynamic virtual channel endpoint 322, 324, 326 may be associated one-to-one with an application 210, 212, 214 (FIG. 2) use and/or reuse instance. In an embodiment of the invention, this one-to-one association reduces the complexities associated with simultaneous reuse of the dynamic virtual channel plug-in 304, 306 functionality by the one or more applications 210, 212, 214. Each dynamic virtual channel endpoint 322, 324, 326 may be associated with a synchronization object and/or a callback object for a thread of execution. The example details depicted by FIG. 3 show the dynamic virtual channel listener 318 having created two dynamic virtual channel endpoints 322, 324, and the dynamic virtual channel listener 320 having created one dynamic virtual channel endpoints 320. Of course each embodiment of the invention is not so limited, and the number and location of dynamic virtual channel endpoints 322, 324, 326 is merely illustrative.

Each dynamic virtual channel plug-in 304, 306 may have an associated remote display client extensibility repository 312, 314. For example, the remote display client extensibility repository 312 may correspond to the dynamic virtual channel plug-in 304, and the remote display client extensibility repository 314 may correspond to the dynamic virtual channel plug-in 306. Remote display client extensibility repositories 312, 314 may be instantiated by the static virtual channel 308 responsive to associated dynamic virtual channel plug-in 304, 306 registration with the static virtual channel 308. The static virtual channel 308 may also include remote display client extensibility repositories such as the remote display client extensibility repository 316 that are associated with, for example, sets of dynamic virtual channel plug-ins 304, 306 and/or a global data space.

As a further part of activation, each dynamic virtual channel plug-in 304, 306 may register properties, functionality and/or components with its associated remote display client extensibility repository 312, 314 (respectively in the example depicted by FIG. 3) and/or other remote display client extensibility repositories such as the remote display client extensibility repository 316. For example, each remote display client extensibility repository 312, 314, 316 may include a property bag object, a managed collection of name-value (or key-value) pairs, and/or any suitable named object container. As part of registration, the remote display client extensibility repositories 312, 314, 316 may store copies of and/or references to dynamic virtual channel plug-in 304, 306 properties, functionality and/or components. References to dynamic virtual channel plug-in 304, 306 properties, functionality and/or components may be direct or indirect and include any suitable programmatic reference including references based on pointers, universally unique identifiers (UUID) and/or name hierarchies. The remote display client extensibility repositories 312, 314, 316 may further provide facilities for retrieving, updating and deleting stored copies and references.

In an embodiment of the invention, remote display client extensibility repositories 312, 314, 316 enable dynamic virtual channel plug-ins 304, 306 to register properties, functionality and/or components at available granularity. For example, the dynamic virtual channel plug-in 304 may have components which further have sub-components. The dynamic virtual channel plug-in 304 may choose to register a subset of its components and/or selected sub-components. The dynamic virtual channel plug-in 304 may include multiple versions of components and/or sub-components, and may choose to register one or more of those versions. The choice of which components and/or sub-components to register may be preconfigured or based on information received, for example, from the remote display client 302, the static virtual channel 308, the remote display client extensibility repository 316 associated with the global data space, and/or any suitable source of configuration information. In particular, dynamic virtual channel plug-ins 304, 306 may select components and/or sub-components to register based on versions of other components in the extensible remote display infrastructure architecture 200 (FIG. 2).

Responsive to dynamic virtual channel plug-in 304, 306 activation, the remote display client 302 may query the remote display client extensibility repositories 312, 314, 316 for copies of and/or references to properties, functionality and/or components registered by the dynamic virtual channel plug-ins 304, 306. The remote display client 302 may query the remote display client extensibility repositories 312, 314, 316 with any suitable query mechanism and/or language. In an embodiment of the invention, remote display client extensibility repositories 312, 314, 316 are configured to return copies of and/or references to registered properties, functionality and/or components matching a set of names. The static virtual channel 308 may be configured to manage access to the remote display client extensibility repositories 312, 314, 316. In such a case, the remote display client extensibility repositories 312, 314, 316 may be queried indirectly by querying the static virtual channel 308.

The remote display client 302 may be preconfigured with the set of names and/or remote display client extensibility repository query terms. The remote display client 302 may base the set of names and/or remote display client extensibility repository query terms on information received, for example, from the remote display client 302, the static virtual channel 308, the remote display client extensibility repository 316 associated with the global data space, and/or any suitable source of configuration information. In particular, the remote display client 302 may base the set of names and/or remote display client extensibility repository query terms on versions of other components in the extensible remote display infrastructure architecture 200 (FIG. 2).

In the case where the queried remote display client extensibility repository 312, 314, 316 stores multiple versions of registered properties, functionality and/or components, the queried remote display client extensibility repository 312, 314, 316 may require the remote display client 302 to specify a particular version, the queried remote display client extensibility repository 312, 314, 316 may return each registered version matching the query, or the queried remote display client extensibility repository 312, 314, 316 may return some subset of the registered versions matching the query (including a subset containing a single version or an empty subset). In the case where the queried remote display client extensibility repository 312, 314, 316 returns some subset of the registered versions, the queried remote display client extensibility repository 312, 314, 316 may make a determination as to the appropriate subset to return based on, for example, information received from and/or retrieved from other components of the extensible remote display infrastructure architecture 200 (FIG. 2). In particular, the determination may be based on versions of other components of the extensible remote display infrastructure architecture 200.

Where the remote display client 302 obtains references to functionality and/or components of the dynamic virtual channel plug-ins 304, 306 from the remote display client extensibility repositories 312, 314, 316, the remote display client 302 may dereference the references to obtain access to the referenced functionality and/or components. In an embodiment of the invention, the remote display client 302 uses this mechanism to obtain access to at least some functionality and/or components of the dynamic virtual channel plug-ins 304, 306. In order to describe how remote display client extensibility repositories 312, 314, 316 facilitate interactive coupling between the remote display client 302 and dynamic virtual channel plug-ins 304, 306 in more detail, it will be helpful to have reference to a more specific example.

Figure 4:
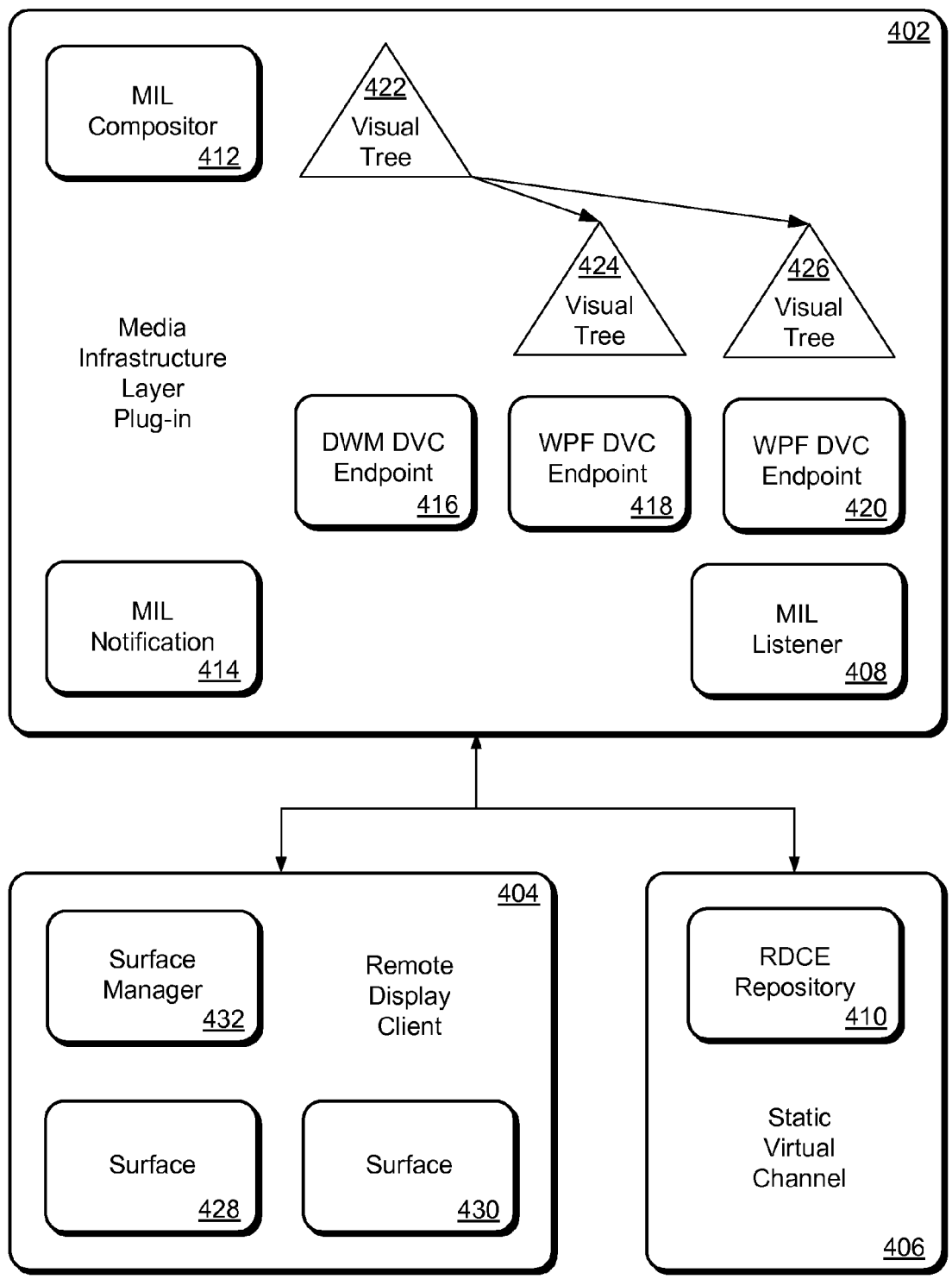
FIG. 4 is a schematic diagram depicting a particular example of client-side aspects of the extensible remote display infrastructure architecture including a media infrastructure layer (MIL) plug-in in accordance with an embodiment of the invention.

A media infrastructure layer (MIL) plug-in is a particular example of a dynamic virtual channel plug-in such as the dynamic virtual channel plug-ins 304, 306. FIG. 4 depicts example details of selected client-side 400 aspects of the extensible remote display infrastructure architecture 200 (FIG. 2) including a media infrastructure layer plug-in 402 in accordance with an embodiment of the invention. The depicted client-side 400 aspects further include a remote display client 404 and a static virtual channel 406. The remote display client 404 may incorporate characteristics of the remote display client 302 of FIG. 3. The static virtual channel 406 may incorporate characteristics of the static virtual channel 308.

The media infrastructure layer plug-in 402 may be loaded and/or activated by the remote display client 404. Responsive to activation, the media infrastructure layer plug-in 402 may register with the static virtual channel 406. The media infrastructure layer plug-in 402 may include a media infrastructure layer listener 408. The media infrastructure layer listener 408 is an example of a dynamic channel plug-in listener such as the dynamic virtual channel plug-in listener 318. During registration, the media infrastructure layer plug-in 402 may register the media infrastructure layer listener 408 with the static virtual channel 406. The static virtual channel 406 may instantiate a remote display client extensibility repository 410 corresponding to the media infrastructure layer plug-in 402, for example, responsive to registration. The remote display client extensibility repository 410 may incorporate characteristics of the remote display client repositories 312, 314 (FIG. 3).

The media infrastructure layer plug-in 402 may incorporate components including a media infrastructure layer (MIL) compositor 412, and a media infrastructure layer (MIL) notification object 414. The media infrastructure layer plug-in 402 may register one or more of its components with the remote display client extensibility repository 410. For example, the media infrastructure layer plug-in 402 may register the media infrastructure layer compositor 412 and the media infrastructure layer notification object 414 with the remote display client extensibility repository 410. In an embodiment of the invention, registering the media infrastructure layer compositor 412 and the media infrastructure layer notification object 414 with the remote display client extensibility repository 410 includes adding references to the media infrastructure layer compositor 412 and the media infrastructure layer notification object 414 to the remote display client extensibility repository 410. Of course, not every component of the media infrastructure layer plug-in 402 need be registered with the remote display client extensibility repository 410.

Once registered with the static virtual channel 406, in an embodiment of the invention, the media infrastructure layer plug-in 402 becomes communicatively addressable, in particular by server-side 204 (FIG. 2) aspects of the extensible remote display infrastructure architecture 200. For example, the application 210 may incorporate desktop window manager (DWM) functionality such as that provided by the Desktop Window Manager aspect of Microsoft® Windows® Vista, and the applications 212, 214 may each incorporate windows presentation foundation (WPF) functionality such as that provided by Windows Presentation Foundation aspects of Microsoft® Windows® Vista. Each of these applications 210, 212, 214 may request that a corresponding dynamic virtual channel be established by the media infrastructure layer listener 408.

The media infrastructure layer listener 408 may instantiate a dynamic virtual channel endpoint such as the dynamic virtual channel endpoints 322, 324, 326 (FIG. 3) for each application 210, 212, 214 (FIG. 2). Continuing the example introduced above, the media infrastructure layer listener 408 may instantiate a desktop window manager (DWM) dynamic virtual channel (DVC) endpoint 416 corresponding to the application 210 and windows presentation foundation (WPF) dynamic virtual channel endpoints 418, 420 corresponding to the applications 212, 214. The media infrastructure layer plug-in 402 may utilize any suitable communication protocol to interact with the applications 210, 212, 214, for example, a communication protocol in accordance with windows presentation foundation and/or desktop window manager functionality such as a remote desktop protocol.

The applications 210, 212, 214 may utilize the dynamic virtual channels 416, 418, 420 to create, read, update and delete corresponding visual trees 422, 424, 426. The visual trees 422, 424, 426 may be visual trees in accordance with windows presentation foundation and/or desktop window manager functionality. For example, the visual trees 422, 424, 426 may include representations of graphical user interface elements arranged into a tree-type data structure. The arrows in FIG. 4 connecting visual tree 422 with visual trees 424, 426 indicate that visual tree 422 may be considered a root of a single visual tree that includes visual trees 424, 426. For example, the visual tree 422 may correspond to a desktop element of a graphical user interface and the visual trees 424, 426 may corresponding to one or more application windows on the desktop. The media infrastructure layer compositor 412 may compose and/or render elements of the visual trees 422, 424, 426 to a suitable render target such as a bitmap and/or display surface, that is, the media infrastructure layer compositor 412 is an example of a visual composition engine. In an embodiment of the invention, the remote display client 404 manages access to suitable render targets and is a supplier of such render targets to the media infrastructure layer compositor 412.

The remote display client 404 may include one or more surfaces 428, 430 managed by a surface manager 432. For example the surfaces 428, 430 may be display surfaces and/or incorporate render targets. The surface manager 432 may create, read, update and delete surfaces such as the surfaces 428, 430, and/or provide facilities for other remote display client 404 components to do so. For example, the remote display client 404 may utilize the surface manager 432 to create, read, update and/or delete the surfaces 428, 430 responsive to activity at the input/output devices 218 (FIG. 2). The surface manager 404 may further provide facilities for interested components to subscribe to surface events such as changes to the surfaces 428, 430.

The remote display client 404 may query the remote display client extensibility repository 410 for components registered by the media infrastructure layer plug-in 402. For example, the remote display client extensibility repository 410 may be dedicated to the media infrastructure layer plug-in 402 and the remote display client 404 may request all registered properties, functionality and components. Alternatively, the remote display client 404 may request registered properties, functionality and components associated with the media infrastructure layer plug-in 402 from the remote display client extensibility repository 410. As a further example, the remote display client 404 may query the remote display client extensibility repository 410 for specific properties, functionality and/or components such as the media infrastructure layer compositor 412 and the media infrastructure layer notification object 414. The query may be responsive to activation of the media infrastructure layer plug-in 402, but each embodiment of the invention is not so limited.

In an embodiment of the invention, the remote display client extensibility repository 410 provides the remote display client 404 with references to the media infrastructure layer compositor 412 and the media infrastructure layer notification object 414 responsive to the query. The remote display client 404 may dereference the references, in a manner well understood by those of skill in the art, to gain access to media infrastructure layer compositor 412 and media infrastructure layer notification object 414 functionality. Having obtained the references, the remote display client 404 may provide the media infrastructure layer compositor 412 with references to one or more suitable render targets, for example, render targets corresponding to the surfaces 428, 430. Furthermore, the remote display client 404 may provide the media infrastructure layer notification object 414 with a reference to the surface manager 432.

The media infrastructure layer compositor 412 may render one or more visual compositions corresponding to the visual trees 422, 424, 426 to the provided render target(s). Having access to functionality of the surface manager 432, the media infrastructure layer notification object 414 may subscribe to surface change events, for example, with a callback mechanism. The media infrastructure layer notification object 414 may send notifications to the media infrastructure layer compositor 412 based on the surface change events. For example, the media infrastructure layer notification object 414 may notify the media infrastructure layer compositor 412 that a composition update is required and/or provide information with respect to user input that is associated with trans-application events and special visual effects such as cursor effects and the like.

In the example depicted by FIG. 4, the remote display client 404 delegates aspects of visual composition and rendering to the media infrastructure layer plug-in 402 while still managing input from, and output to, the input/output devices 218 (FIG. 2). In an embodiment of the invention, such utilization of dynamic virtual channel plug-ins 220, 222, 224 enables the extensible remote display infrastructure architecture 200 to facilitate a cohesive and/or consistent graphical user interface experience while varying the implementation of the remote display client 404, for example, while replacing the implementation with implementations from different vendors. Such benefits are not limited to graphical user interface experience, for example, utilization of dynamic virtual channel plug-ins 220, 222, 224 in accordance with an embodiment of the invention may enable cohesive and/or consistent experience with respect to other aspects of operating system functionality such as input/output device plug-and-play (PnP) functionality, and to other application 210, 212, 214 functionality, while varying the implementation of the remote display client 216.

Figure 5:
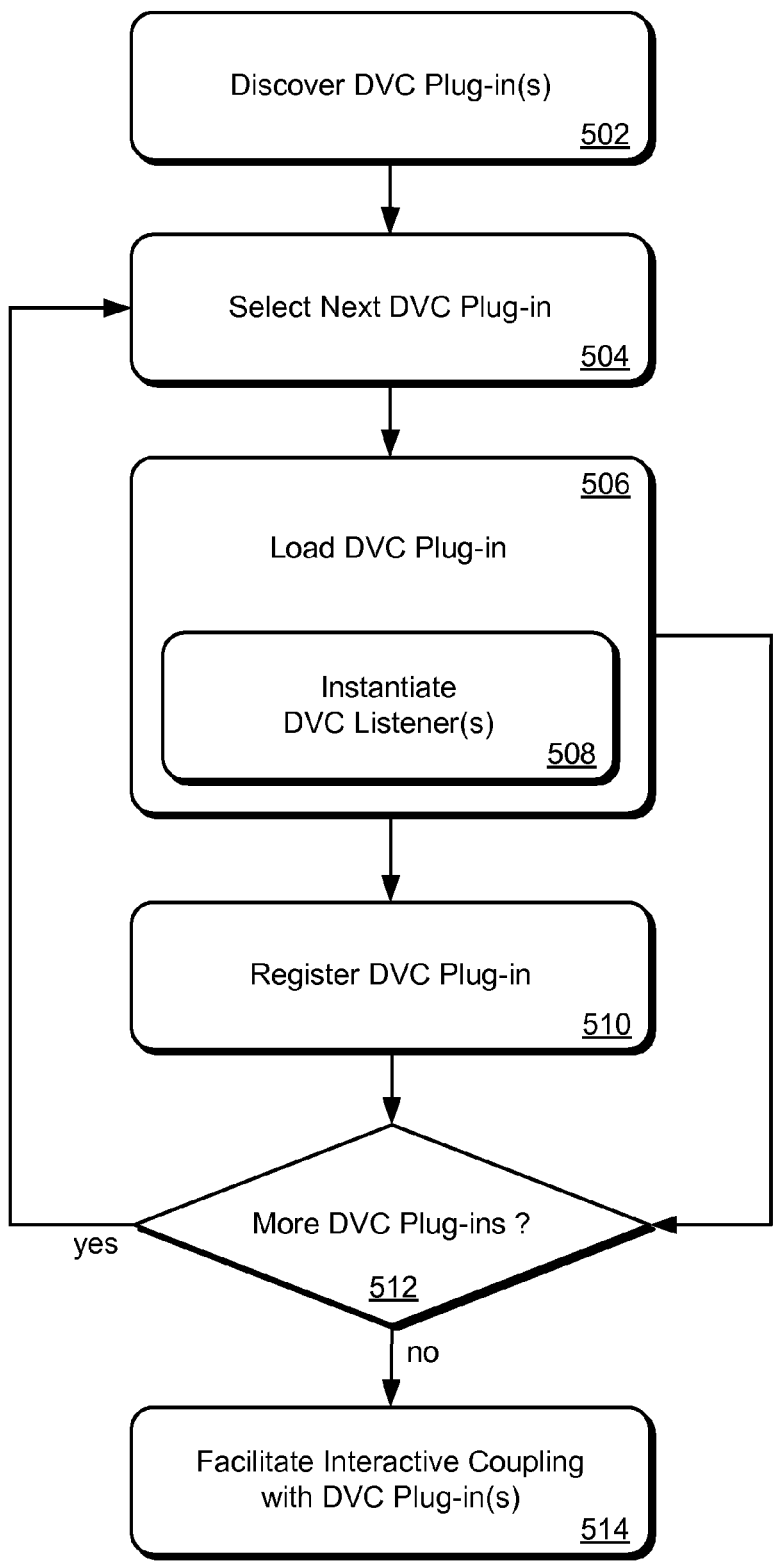
FIG. 5 is a flowchart depicting example steps for extensible remote display in accordance with an embodiment of the invention.

Having described components and example details of the extensible remote display infrastructure architecture 200 (FIG. 2) in some detail, the description now turns to methods that may be performed by such components in accordance with an embodiment of the invention. FIG. 5 depicts example steps for extensible remote display that may be performed by client-side 300 (FIG. 3) components of the extensible remote display infrastructure architecture 200. At step 502, a set of dynamic virtual channel plug-ins may be discovered, for example, the dynamic virtual channel plug-ins 304, 306 may be discovered by the remote display client 302 as described above.

At step 504, a next dynamic virtual channel plug-in may be selected from the set of discovered dynamic virtual channel plug-ins. For example, the remote display client 302 (FIG. 3) may select one of the dynamic virtual channel plug-ins 304, 306. At step 506, the selected dynamic virtual channel plug-in may be loaded. For example, the remote display client 302 may perform a loading action as described above with respect to the dynamic virtual channel plug-in 304. At step 508, one or more dynamic virtual channel listeners may be instantiated for the selected dynamic virtual channel plug-in. For example, the dynamic virtual channel listener 318 may be instantiated by the dynamic virtual channel plug-in 304. Step 508 may be performed as part of step 506.

At step 510, the selected dynamic virtual channel plug-in may be registered. For example, the dynamic virtual channel plug-in 304 (FIG. 3) may register with the static virtual channel 308. Example steps for dynamic virtual channel plug-in registration are described below in more detail with reference to FIG. 6.

At step 512, it may be determined if there are more dynamic virtual channel plug-ins in the set of discovered dynamic virtual channel plug-ins (i.e., dynamic virtual channel plug-ins that have not yet been selected). If there are more dynamic virtual channel plug-ins, a procedure including the steps of FIG. 5 may return to step 504 to select the next dynamic virtual channel plug-in. Otherwise, the procedure may progress to step 514.

At step 514, interactive coupling with the registered dynamic virtual channel plug-ins may be facilitated. For example, the static virtual channel 308 (FIG. 3) may participate in facilitating interactive coupling between the remote display client 302 and the dynamic virtual channel plug-ins 304, 306. Example steps for facilitating interactive coupling are described below in more detail with reference to FIG. 7.

Figure 6:
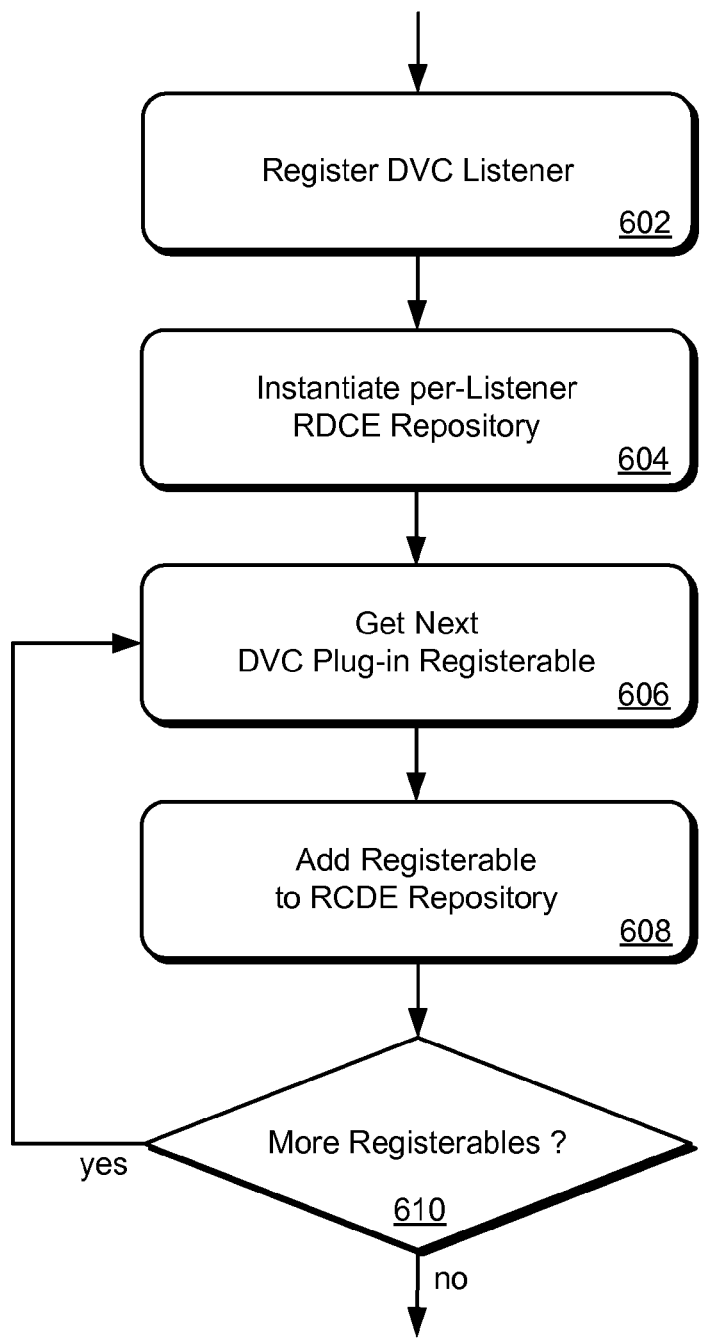
FIG. 6 is a flowchart depicting example steps for dynamic virtual channel (DVC) plug-in registration in accordance with an embodiment of the invention.

FIG. 6 depicts example steps for dynamic virtual channel plug-in registration in accordance with an embodiment of the invention. For example, the steps depicted by FIG. 6 may be performed as part of step 510 (FIG. 5). At step 602, a dynamic virtual channel listener may be registered. For example, the dynamic virtual channel plug-in 304 (FIG. 3) may register the dynamic virtual channel listener 318 with the static virtual channel 308 as described above. At step 604, a per-listener remote display client extensibility repository may be instantiated. For example, the static virtual channel 308 may instantiate the remote display client extensibility repository 312 corresponding to the dynamic virtual channel plug-in 304. As a further example, if the dynamic virtual channel plug-in 306 were to register at some later time, the static virtual channel 308 may instantiate the corresponding remote display client extensibility repository 314 at that later time.

Each dynamic virtual channel plug-in such as the dynamic virtual channel plug-ins 304, 306 (FIG. 3) may include a set of one or more dynamic virtual channel plug-in registerables such as dynamic virtual channel plug-in properties, functionality and/or components. The set of potential dynamic virtual channel plug-in registerables may differ from the set of actual dynamic virtual channel plug-in registerables, and from the set of registered dynamic virtual channel plug-in registerables. For example, some potentially registerable dynamic virtual channel plug-in properties, functionality and/or components may not be made actually registerable (e.g., for design reasons), and the set of currently registered dynamic virtual channel plug-in registerables may vary from moment to moment.

At step 606, a dynamic virtual channel plug-in registerable may be selected from a set of dynamic virtual channel plug-in registerables, for example, from the set of dynamic virtual channel plug-in 304 (FIG. 3) registerables. At step 608, the selected dynamic virtual channel plug-in registerable may be added to a remote display client extensibility repository, for example, a copy of and/or a reference to the selected dynamic virtual channel plug-in registerable may be stored in the remote display client extensibility repository 312 corresponding to the associated dynamic virtual channel plug-in 304. At step 610, it may be determined if there are more dynamic virtual channel plug-in registerables to be selected from the set of dynamic virtual channel plug-in registerables. If there are more dynamic virtual channel plug-in registerables in the set, a procedure incorporating the steps depicted by FIG. 6 may return to step 606. Otherwise, the procedure may progress to steps not depicted in FIG. 6, for example, to step 512 of FIG. 5.

Figure 7:
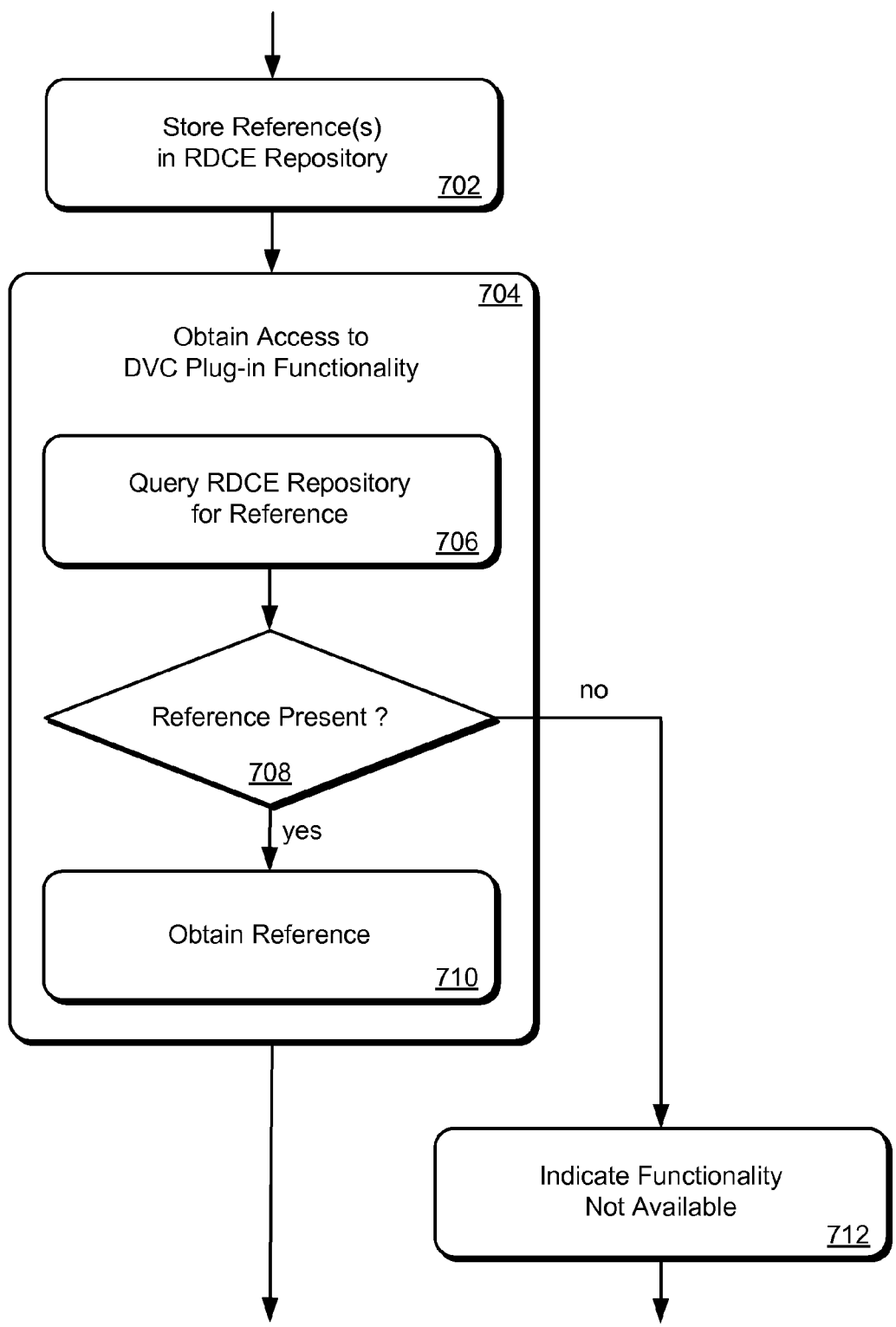
FIG. 7 is a flowchart depicting example steps for facilitating interactive coupling between a remote display client and one or more dynamic virtual channel plug-ins in accordance with an embodiment of the invention.

FIG. 7 depicts example steps for facilitating interactive coupling in accordance with an embodiment of the invention. For example, the steps depicted by FIG. 7 may be incorporated into one or more steps depicted by FIG. 5. At step 702, one or more references may be stored in a remote display client extensibility repository such as the remote display client extensibility repository 312 (FIG. 3). For example, the references may be references to one or more registerables of a dynamic virtual channel plug-in such as the dynamic virtual channel plug-in 304, and the references may be stored in a remote display client extensibility repository such as the remote display client extensibility repository 312 as part of step 608 (FIG. 6). At step 704, access to functionality of the dynamic virtual channel plug-in may be obtained. For example, the remote display client 302 may obtain access to functionality of the dynamic virtual channel plug-in 304 with the references stored at step 702.

At step 704, the remote display client extensibility repository may be queried for a particular reference. For example, the remote display client extensibility repository 312 (FIG. 3) may be queried by the remote display client 302 for a reference to a particular dynamic virtual channel plug-in 304 registerable. At step 706, it may be determined if the desired reference is present in the remote display client extensibility repository. If the reference is present in the remote display client extensibility repository, a procedure incorporating the steps depicted by FIG. 7 may progress to step 710. Otherwise, the procedure may progress to step 712. At step 710, the desired reference may be obtained. For example, the remote display client extensibility repository 312 may provide the desired reference to the remote display client 302. At step 712, an indication may be provided that access to the desired functionality is not available. For example, the remote display client extensibility repository 312 may provide the indication to the remote display client 302. Steps 706, 708 and 710 may be incorporated into step 704.

Figure 8:
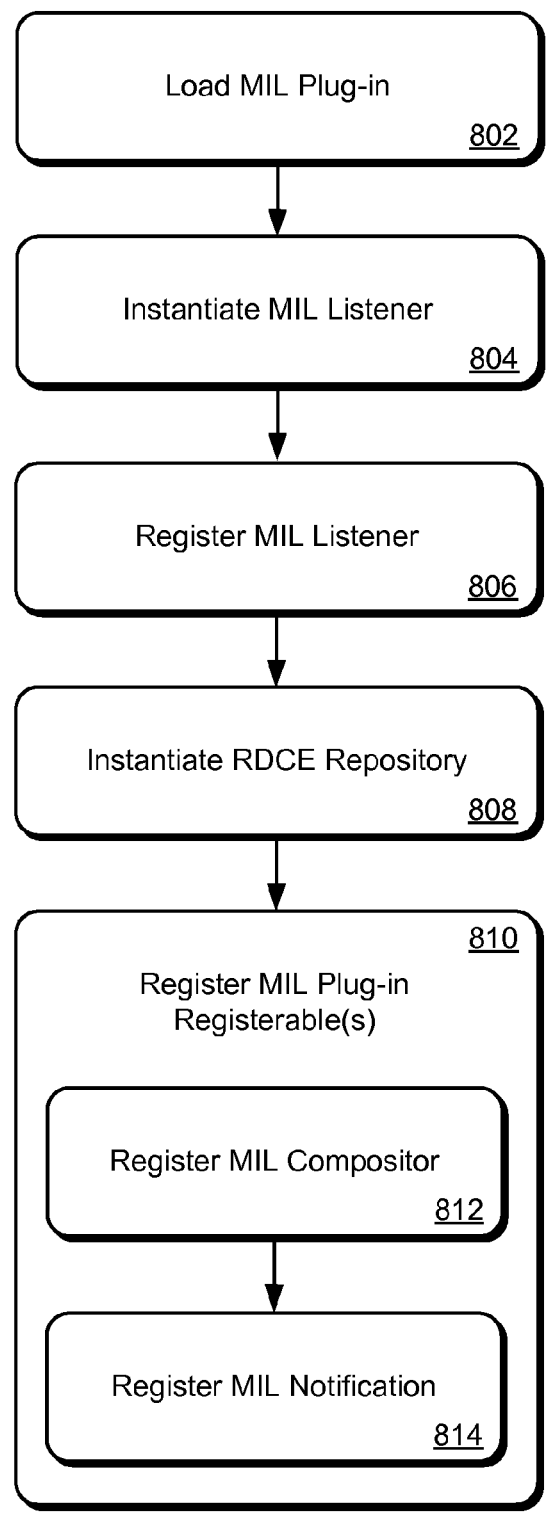
FIG. 8 is a flowchart depicting example steps for loading the media infrastructure layer plug-in in accordance with an embodiment of the invention.
Figure 9:
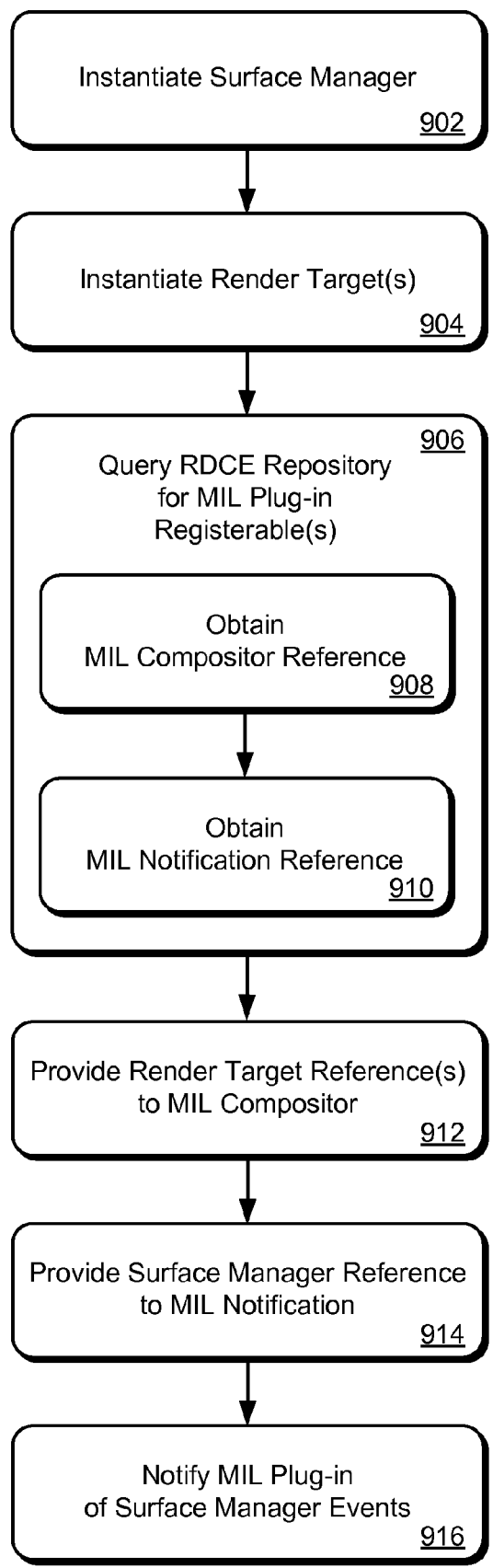
FIG. 9 is a flowchart depicting example steps for coupling interactively with the media infrastructure layer plug-in in accordance with an embodiment of the invention.

The steps described with reference to FIGS. 5, 6 and 7 are in accordance with aspects of the extensible remote display infrastructure architecture 200 as described with reference to FIGS. 2 and 3. FIGS. 8 and 9 depict steps in accordance with the particular media layer infrastructure plug-in 402 example as described with reference to FIG. 4. For example, the steps depicted by FIG. 8 may be incorporated into one or more steps depicted by FIGS. 5 and 6.

At step 802, the media infrastructure layer (MIL) plug-in 402 (FIG. 4) may be loaded. For example, the media layer infrastructure plug-in 402 may be loaded by the remote display client 404 as described above. At step 804, the media infrastructure layer listener 408 may be instantiated. For example, the media infrastructure layer listener 408 may be instantiated by the media infrastructure layer plug-in 402. At step 806, the media infrastructure layer listener 408 may be registered. For example, the media infrastructure layer listener 408 may be registered with the static virtual channel 406.

At step 808, a remote display client extensibility repository corresponding to the media infrastructure layer plug-in 402 (FIG. 4) may be instantiated. For example, the remote display client extensibility repository 410 may be instantiated by the static virtual channel 406. At step 810, one or more media infrastructure layer plug-in 402 registerables may be registered. For example, the media infrastructure layer plug-in 402 registerables may be registered by the media infrastructure layer plug-in 402 with the remote display client extensibility repository instantiated at step 808.

The media infrastructure layer plug-in 402 registerables may include the media infrastructure layer compositor 412 and the media infrastructure layer notification object 414. At step 812, the media infrastructure layer compositor 412 may be registered. For example, a reference to the media infrastructure layer compositor 412 may be added to the remote display client extensibility repository 410. At step 814, the media infrastructure layer notification object 414 may be registered. For example, a reference to the media infrastructure layer notification object 414 may be added to the remote display client extensibility repository 410. Steps 812 and 814 may be incorporated into step 810.

In an embodiment of the invention, the media infrastructure layer plug-in 402 (FIG. 4) registerables are registered in order to provide access to their functionality to other components of the extensible remote display infrastructure architecture 200 (FIG. 2). FIG. 9 depicts example steps utilizing media infrastructure layer plug-in 402 registerables and their functionality in accordance with an embodiment of the invention.

At step 902, a surface manager such as the surface manager 432 (FIG. 4) may be instantiated. For example, the surface manager 432 may be instantiated by the remote display client 404. At step 904, one or more render targets may be instantiated. For example, the render target(s) may be instantiated by the remote display client 404, or the remote display client 404 may request that the render target(s) be instantiated by one or more of the input/output devices 218 (FIG. 2) and/or an operating system of the computer 106 (FIG. 1).

At step 906, the remote display client extensibility repository 410 (FIG. 4) may be queried for one or more media infrastructure layer plug-in 402 registerables. For example, the remote display client 404 may query the remote display client extensibility repository 410 as described above. In this example, the media infrastructure layer plug-in 402 has registered the media infrastructure layer compositor 412 and the media infrastructure layer notification object 414 with the remote display client extensibility repository 410, for example, with step 810 of FIG. 8. At step 908, responsive to the query of step 906, a reference to the media infrastructure layer compositor 412 may be obtained, for example, by the remote display client 404. Similarly, a reference to the media infrastructure layer notification object 414 may be obtained at step 910. Steps 908 and 910 may be incorporated into step 906.

Having obtained the references at step 906, the remote display client 404 (FIG. 4) may dereference them to gain access to functionality of the associated media infrastructure layer plug-in 402 components. At step 912, references to one or more render targets may be provided to the media infrastructure layer compositor 412. For example, the remote display client 404 may provide references to one or more render targets associated with the surfaces 428, 430 to the media infrastructure layer compositor 412. At step 914, a reference to the surface manager 432 may be provided to the media infrastructure layer notification object 414, for example, by the remote display client 404.

The media infrastructure layer notification object 414 may be configured to utilize the provided reference to subscribe to surface manager 432 events as described above. At step 916, the media infrastructure layer plug-in 402 may be notified of events generated by the surface manager 432. For example, the surface manager 432 may notify its subscribers of generated events and, in particular, the media infrastructure layer notification object 414. The media infrastructure layer notification object 414 may, in turn, notify components of the media infrastructure layer plug-in 402 with same and/or associated events and, in particular, the media infrastructure layer compositor 412.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to an embodiment of the invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

The invention claimed is:

1. A computer-implemented extensible remote display system of a client computing device comprising:
    a dynamic virtual channel plug-in providing a remote display client service, the dynamic virtual channel plug-in includes a plurality of dynamic virtual channel endpoints;
    a remote display client capable of discovering the dynamic virtual channel plug-in;
    a static virtual channel to receive a multiplexed signal from a server computing device, the multiplex signal including multiple communications from a plurality of remote applications; and
    a dynamic virtual channel multiplexer to facilitate a communication of the multiplex signal to the dynamic virtual channel plug-in, the dynamic virtual channel plug-in including functionality for use by the plurality of remote applications such that individual ones of the multiple communications of the multiplex signal are communicated to the dynamic virtual channel plug-in,
    wherein individual ones of the plurality of dynamic virtual channel endpoints are associated with a different one of the plurality of remote applications,
    wherein the functionality of the dynamic virtual channel plug-in being simultaneously reused by the plurality of remote applications based on the association between the dynamic virtual channel endpoints and the plurality of remote applications.

2. The system of claim 1, wherein the dynamic virtual channel plug-in comprises a dynamic virtual channel listener capable of instantiating a plurality of dynamic virtual channels.

3. The system of claim 1, wherein the remote display client displays at least a portion of a graphical user interface of the remote application.

4. The system of claim 1, wherein the multiple communications of the multiplex signal are individually addressable by individual ones of the plurality of remote applications to individual instances of the dynamic virtual channel plug-in.

5. The system of claim 1, wherein the static virtual channel is resident at the client computing device and has a corresponding server side static virtual channel resident at the server computing device, the static virtual channel being a virtual communication channel that facilitates communication multiplexing in addition to that provided by a data transport layer.

6. The system of claim 1, wherein:
    the static virtual channel comprises a remote display client extensibility repository including a managed collection of key-value pairs;
    the dynamic virtual channel plug-in comprises a dynamic virtual channel listener; and
    the remote display client extensibility repository corresponds to the dynamic virtual channel listener.

7. The system of claim 6, wherein the remote display client extensibility repository corresponds to a global remote display client data space.

8. The system of claim 1, wherein:
    the static virtual channel comprises a remote display client extensibility repository including a managed collection of key-value pairs;
    the dynamic virtual channel plug-in comprises a visual composition engine; and
    the remote display client is configured to, at least, obtain a reference to the visual composition engine from the remote display client extensibility repository.

9. The system of claim 8, wherein the remote display client is further configured to, at least, provide a render target to the referenced visual composition engine.

10. The system of claim 8, wherein:
    the dynamic virtual channel plug-in further comprises a notification object; and
    the remote display client is further configured to, at least:
        obtain a reference to the notification object from the remote display client extensibility repository; and
        provide a surface manager to the referenced notification object.

11. A computer-readable medium having thereon computer-executable instructions for extensible remote display comprising:
    discovering a dynamic virtual channel plug-in of a local computing device, the dynamic virtual channel plug-in includes a plurality of dynamic virtual channel endpoints;
    receiving a multiplexed signal, the multiplex signal including multiple communications from a plurality of applications of a remotely located computing device; and
    facilitating a communication of the multiplex signal between the plurality of applications and the dynamic virtual channel plug-in of the local computing device, including simultaneously reusing a functionality of the dynamic virtual channel plug-in by the plurality of applications based on an association between individual ones of the dynamic virtual channel endpoints and individual ones of the plurality of remote applications.

12. The medium of claim 11, wherein:
    the dynamic virtual channel plug-in comprises a dynamic virtual channel listener; and
    the computer-executable instructions further comprise instantiating a remote display client extensibility repository for the dynamic virtual channel listener.

13. The medium of claim 11, wherein the computer-executable instructions further comprise instantiating a remote display client extensibility repository corresponding to a global remote display client data space.

14. The medium of claim 13, wherein the facilitating the communication comprises:
    storing a reference to a component of the dynamic virtual channel plug-in in the remote display client extensibility repository; and
    obtaining the reference from the remote display client extensibility repository.

15. The medium of claim 13, wherein:
    the dynamic virtual channel plug-in comprises a media infrastructure layer plug-in comprising a media infrastructure layer compositor;
    the remote display client extensibility repository comprises a remote display client extensibility repository corresponding to the media infrastructure layer plug-in; and
    the facilitating the communication comprises:

storing a reference to the media infrastructure layer compositor in the remote display client extensibility repository corresponding to the media infrastructure layer plug-in; and obtaining the reference to the media infrastructure layer compositor from the remote display client extensibility repository corresponding to the media infrastructure layer plug-in.

16. The medium of claim 11, wherein a remote display client discovers the dynamic virtual channel plug-in and presents multiple instances of the plurality of applications.

17. A computer-implemented method of extensible remote display comprising:

loading at least one dynamic virtual channel plug-in, the at least one dynamic virtual channel plug-in includes a plurality of dynamic virtual channel endpoints;

registering the at least one dynamic virtual channel plug-in with a static virtual channel;

multiplexing a plurality of communications from multiple applications of a server computing device and the at least one dynamic virtual channel plug-in into a single multiplexed signal, individual ones of the multiple applications are associated with different ones of the plurality of dynamic virtual channel endpoints;

communicating the single multiplexed signal over the static virtual channel to the at least one dynamic virtual channel plug-in such that a functionality of the dynamic virtual channel plug-in is simultaneously reused by the multiple applications based on the association between the dynamic virtual channel endpoints and the multiple applications; and managing the simultaneous reuse of the dynamic virtual channel plug-in with dynamic virtual channels.

18. The method of claim 17, wherein:

registering the at least one dynamic virtual channel plug-in comprises:

storing at least one reference to the at least one dynamic virtual channel plug-in in at least one remote display client extensibility repository; and retrieving the at least one reference from the at least one remote display client extensibility repository.

19. The method of claim 18, wherein the storing the at least one reference comprises storing the at least one reference in the remote display client extensibility repository corresponding to a dynamic virtual channel listener.

20. The method of claim 18, wherein the at least one remote display client extensibility repository comprises at least one remote display client extensibility repository corresponding to a global remote display client data space.

* * * * *